United States Patent [19]

Martin

[11] Patent Number: 4,955,716
[45] Date of Patent: Sep. 11, 1990

[54] METHOD AND DEVICE TO DETERMINE A RELATIVE REFERENCE POSITION FOR AN ANGLE MEASUREMENT OF AN OBJECT

[75] Inventor: Robert J. Martin, Lynchburg, Va.

[73] Assignee: Hofmann Werkstatt-Technik GmbH, Pfungstadt, Fed. Rep. of Germany

[21] Appl. No.: 293,899

[22] Filed: Jan. 5, 1989

[30] Foreign Application Priority Data

Jan. 5, 1988 [DE] Fed. Rep. of Germany ....... 3800121

[51] Int. Cl.⁵ .............................................. G01B 11/26
[52] U.S. Cl. ...................................... 356/152; 73/462; 73/657; 73/660
[58] Field of Search ................... 73/462, 657, 660; 244/3.13; 356/152

[56] References Cited

U.S. PATENT DOCUMENTS

| | | |
|---|---|---|
| 3,644,042 | 2/1972 | Kolb, Jr. et al. ...................... 73/655 |
| 3,879,988 | 4/1975 | Jacobs .................................... 73/657 |
| 4,086,808 | 5/1978 | Camac et al. .......................... 73/655 |
| 4,334,777 | 6/1982 | Bien et al. .............................. 73/657 |
| 4,601,580 | 7/1986 | Halliwell ................................ 73/657 |

Primary Examiner—Charles T. Jordan
Assistant Examiner—Richard W. Wendtland
Attorney, Agent, or Firm—Cushman, Darby & Cushman

[57] ABSTRACT

A method and device to determine the relative reference position for an angle measurement of an object within an angle scale covering the round angle of the entire rotation of the object and divided into several angle areas of equal size on an exposed target area on or attached to the object of which an illuminated orbit is scanned. A significant deviation of the beam characteristics at least one point on the orbit forms a reference signal, which is coupled to the angle value of an angle scale to determine the reference angle position on the object.

22 Claims, 3 Drawing Sheets

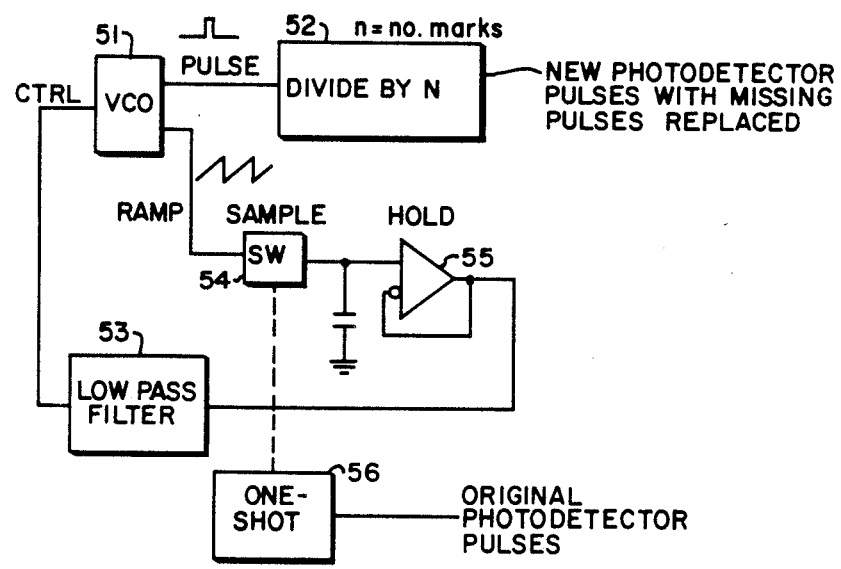

METHOD AND DEVICE TO DETERMINE A RELATIVE REFERENCE POSITION FOR AN ANGLE MEASUREMENT OF AN OBJECT

BACKGROUND OF THE INVENTION

The present invention relates to a method and device to determine a relative reference position for an angle measurement of an object and more particularly to a method and device to determine a relative reference position for an angle measurement of an object of any shape.

In the determination of angle position of measurements, marks or other properties of a test or other object, it is necessary to make such measurements with respect to a reference point or reference angle. For instance, in the measurement of rotor imbalances, the imbalance is measured in terms of size and angle position so that additional weight can be added to the rotor at the correct points to counteract the imbalance.

Under conventional systems, a mark is made on the test object or rotor in order to obtain a reference angle signal, and the impulse generated thereby is used as a reference for the angle measurement. It is also known (for instance from German Pat. Application Ser. No. 2 243 002) that, with rotors which are manufactured with imbalance counteraction points at specified positions, such as with electric motor anchors, the counteraction points on the rotor are scanned and the impulses gained hereby are used as a phase reference signal impulse. With this method it is also necessary to subdivide the round angle represented by the rotor diameter into several incremental angles in order to make precise imbalance counteraction. With conventional processes, this round angle division results from the impulses arising from the individual counterpoints during the rotor rotation.

SUMMARY OF THE INVENTION

It is an object of the present invention to produce a method and a device for the determination of the relative reference position of an angle measurement on an object particularly rotors, which can be made regardless of the shape of the object.

In accordance with the present invention angle position can be made both with an object at rest such as a test object as well as with the object in motion such as a rotor. No contact is made with the object while measurements are being made, thus no additional outside forces act upon, nor are any changes made to, the object.

While taking measurements or obtaining the reference angle, a photoelectric means and a surface area running approximately parallel to the turning axis of the object is used as the target area for the object. Such a object surface is particularly useful if it is reflective. The surface may, however, also be transparent in order to permit the necessary scanning of the orbit of the target area. The target area does not need to be on the test object for which the angle test is to be undertaken, but can also be a separate surface on the orbit which can be illuminated. Since it is preferable that the illuminated orbit of the target area be produced by a rotating beam, it is preferable that the target area be vertical to the axis around which the beam rotates. The orbit may be either circular or elliptical. The orbit can also be uninterrupted and in the form of a curve.

In order to obtain coordination of the various incremental angles which form a round angle of the entire object or rotor for which the angle positioning is to be performed, the object is marked in one or several places, preferably on the orbit onto which the radiation especially visible light is directed, with colored marks or areas of increased or reduced reflectance or with areas of increased or reduced transparency.

In the preferred embodiment, irradiation is performed by visible light, although other types of light such as infrared light can be used.

In order to obtain the change in signal characteristics at a specific point necessary to form a reference signal, such as a change in the light intensity the target area around the rotating beam is marked with an area of increased or decreased reflectivity which influences the beam directed at the target area.

Scanning of the orbit on the target area takes place in such a manner that the entire target area is illuminated and a surface area of maximum sensitivity is led along a curve or along the closed orbit. In this manner, changes in, for instance, the reflected light at one or more significant points along the orbit can be measured.

Further, the target surface can also be scanned by a specific beam form, particularly points of light, which strike the target surface along at least a curved orbit, so that an area of maximum sensitivity of the detection unit follows this path in order to detect particular changes in the reflection at one or more significant points.

The beams generated at the source can be modulated or coded so that the beams reflected or allowed through the target area can be differentiated from those emanating from surrounding sources.

Various devices and methods can be used to lead the beam aimed at the target area and to guide the sensitive detectors following the beams path. For instance, electrostatic deflectors, electromagnetic deflectors, mirror prisms or other beam reflecting or breaking equipment driven by motors, servomotors, stepper motors, hydraulics, magnetic fields or other means can be used.

In the preferred embodiment, the beams sent from the source, particularly visible light, are focussed by means of tilted mirrors, whereby one of the mirrors rotates and aims the beams at the target area to form the desired orbit. With this method, the reflected beams can return along the same path and be fed to a detector unit, particularly a photodetector, by an half- silvered tilted mirror. In this way, a reference signal can be obtained.

In order to obtain an angle scale, a cover can, for instance, move at a set rotational speed through the path of a fixed beam running between an emitter and a receiver. When the cover crosses the beam path, the zero point of the scale is obtained. An incrementation unit can be connected to the receiver in order to obtain the desired size of the incremental angles. A unit such as is shown in German Pat. Application Ser. No. DE-AS 1 648 520 can also be used.

BRIEF DESCRIPTION OF THE DRAWINGS

FIG. 5 is a block diagram of an evaluation circuit connected to the photodetector shown in FIG. 4.

DETAILED DESCRIPTION OF A PREFERRED EMBODIMENT

Figure 1:
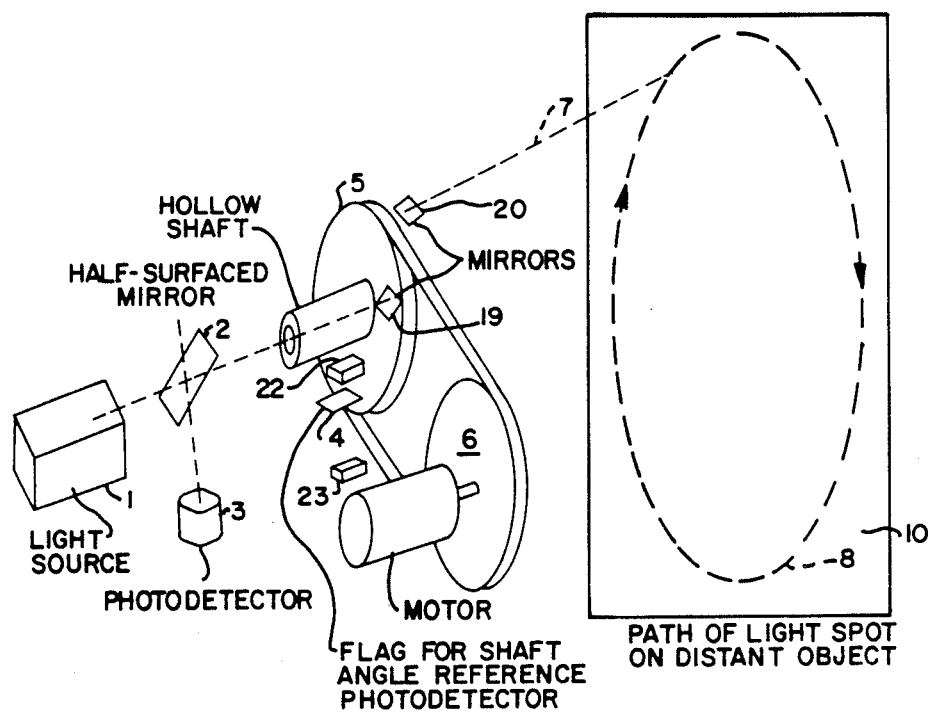
FIG. 1 is a perspective view of the device which directs a beam toward a target area according to the present invention.

The device shown in FIG. 1 consists of a source 1 for producing an energy beam, for instance source 1 may be a light source which emits a focussed beam of light, or a small laser. The energy beam, or light beam has a very small diameter. This beam passes through a half-silvered mirror 2. The half-silvered mirror 2 is positioned so that a first half of the beam passes through the mirror 2 and the other half is reflected and passes to a detector 3. The first half passes to a tilted mirror 19. This tilted mirror 19 is mounted on the axis of and is connected to a disc 5 which is driven by a motor 6 by, for instance, a belt drive 18. Positioned on the other side of disc 5 relative to the tilted mirror 19 there is another tilted mirror 20 attached to the rim of the disc 5 which makes an orbit around the disc 5. This tilted mirror 20 directs the beam 7 onto the target area 10 either separated from the object but preferably is the object itself such as a rotor, ready for balancing. Because of the rotation of the tilted mirror 20, an orbit 8 is produced on the target area 10 in the form of a circle.

Figure 2:
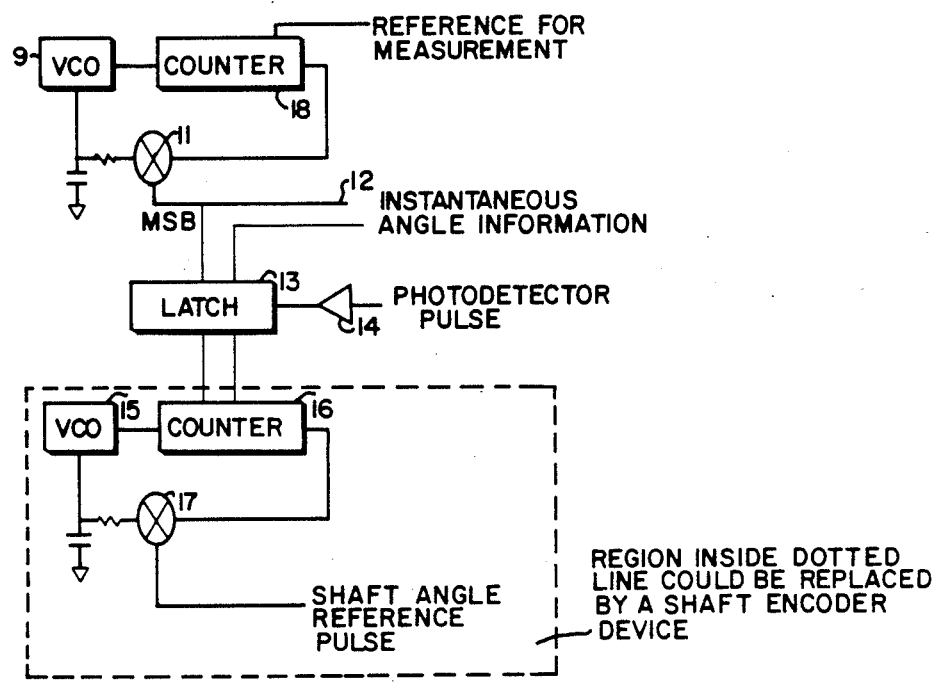
FIG. 2 is a block diagram of an evaluation circuit connected to the photodetector shown in FIG. 1.

A cover unit 4 which breaks the light path between an emitter 22 and a light receiver 23 is attached to the disc 5. In this manner a starting impulse is produced which forms the zero or starting point for an angle division of the orbit 8. By this means, provision has been made for an angle scale unit. At every rotation of the disc 5 and every rotation of the beam 7 around the disc axis, this starting point signal is produced by the receiver 23. As can be seen in FIG. 2, this signal is fed to a phase detector 17 which is part of the phase-locked control circuit 21. This phase-locked control circuit 21 also contains a voltage-controlled oscillator 15 as well as a counter 16. As can be seen in FIG. 2, the phase detector or filter 17, the voltage-controlled oscillator 15 and the counter 16 are switched to a control loop. Once the thus formed phase-locked control loop is closed, the counter 16 is synchronized with the rotation of the disc 5, that is, with the rotation of the beam 7 which forms the orbit 6 on the target surface 10.

The counter 16 which performs the function of a digital divider divides a complete revolution of the disc 5, that is, a revolution of the angle corresponding to beam 7, into equal angle areas or incremental angles so that the conditions or angle scale for the angle positioning of the light point or the beam at any given point in time on orbit 8 is achieved. The division of the round angle can then be achieved by designing the counter 16 as a modulo-n counter. The modulo-n count of the counter 16 can hereby be selected in such a manner that the smallest incremental angle of the orbit of the beam 7 or the disc 5 which can be selected is large enough to perform the desired angle measurement on the test object or rotor. Rotating the disc 5, which carries the tilted mirror 20 on the rim with it, locks the phase-locked control circuit consisting of the voltage-controlled oscillator 15, the counter 16 and the phase detector/filter 17 into the rotational speed of the disc 5, so that, with reference to the contents of the counter 16, the angle position of the rotating disc 5 or the beam on the orbit 8 with respect to the starting point or zero point of the orbit can be determined for any given moment.

Another coding system which shows the relative angle position of the tilted mirror 20 or the beam on the orbit 8 may also be employed in place of the phase-locked control circuit 21 in order to produce an angle scale.

The light reflected from the target area 10 in the area of the orbit 8 returns along the emitted beam path to the half-silvered mirror 2. This half-silvered mirror 2 reflects half the returning light to a photodetector 3. In order for the detector 3 to evaluate the intensity of the beam, during the rotation of orbit 8, a signal processor 14 is connected to the detector 3 as can be seen in FIG. 2. It is preferable that this processor be in the form of a threshold detector which generates an output impulse for each revolution of the beam point on the orbit 8.

Figure 3:
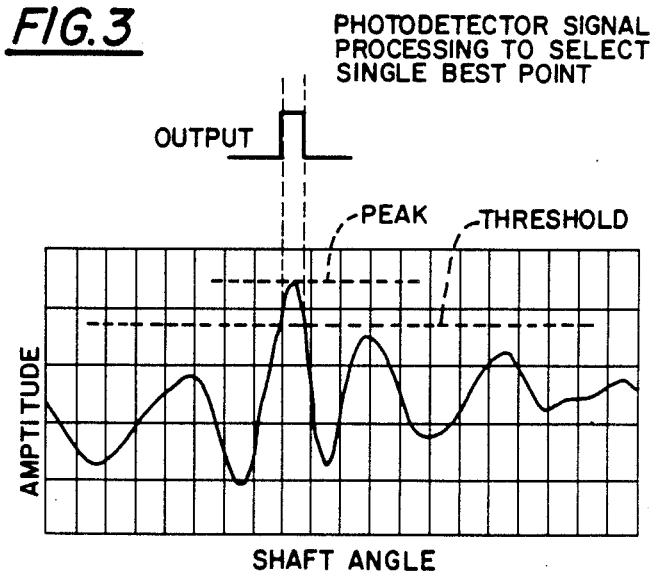
FIG. 3 is a graph showing a curve plot of a photodetector signal.

In order to generate an output impulse per revolution, the threshold value is stored by storing the peak values of previous rotations or revolutions and selecting a threshold level which lies below the highest desired peak value yet above the remaining signals, as is shown in FIG. 3. In this way, one of the peak values arising from the reflected light from the orbit 8 of the beam point on the target area 10 can be used as the reference signal, as shown in FIG. 3. This peak value to be used as a reference signal can arise from a mark or other special formation on the target area 10 in the orbit 8 by which the intensity of the reflected beam, is sharply varied. This impulse-shaped reference signal is stored in a digital memory 13. Hereby, an input of the signal memory 13 with which the counter 16 of the phase-locked control circuit 21 is connected is synchronized in such a manner that the angle value at any given moment which the beam point on the orbit 8 obtains is coupled with the reference value coming from the signal processor 14 so that the desired reference angle signal can be obtained. In this manner, the position of the target area 10 or the position of the test object on which the target area 10 may be located is placed in relation with the angle scale which divides the round angle into incremental angles as described previously. The device forming the angle scale consists of the cover 4 on the disc 5, the emitter 22, the receiver 23 and the phase-locked control circuit 21 connected to the receiver 23.

If the target area 1? is stationary, the same angle value will always be generated by the counter 16 in the signal memory and coupled with the reference signal produced by the signal processor 14. If the target area 10 rotates along with the test object, particularly if a rotor is to be tested, the signals from the counter 16 will differ from the sequentially produced reference signals from the signal processor 14. Differing angle values will be obtained for the reference signal produced by the cover 4 on the disc 5. If the beam point on the orbit 8 rotates at higher revolutions than the rotation of the target area 10, a sufficient number of scans to meet the minimum requirements of a scan theory will be obtained. The angle information concerning the reference signal arriving at any given moment to produce the starting point of the orbit on the target (signal 12 in FIG. 2) will be accurate enough to supply dynamic angle data for the measuring procedure. This is also the case when the beam point on the target area 10 revolves in the opposite direction to the target area 10.

The angle information signal 12 for the reference angle position at any given moment generated by the signal memory 13 can be used directly to calculate the angle position to be determined for the object, such as the imbalance of a turning rotor. The positions required to counteract, for instance, a rotor imbalance can then be noted and appropriate measures can be taken.

The measurements can be further improved if the rotation of the target area is divided into equal parts. The most significant bit of momentary angle information changes from 1 to 0 exactly once per rotation of the target area 10. The most significant bit of momentary angle information is too high for one half of the rotation of the target area and too low for the other half of the rotation of the target area. This signal or bit is sent to a phase detector and filter switch 11 where, with the output of the counter 18, an oscillation of the voltagecontrolled oscillator 9 is caused at such a frequency that an output impulse is given off from the counter 16 acting as a digital divider for each complete revolution of the target area 10 with respect to the starting point or zero point of the orbit 8 determined by the cover 4 on the disc 5.

When the phase-controlled control loop consisting of the voltage-controlled oscillator 9, the phase detector and filter switch 11 as well as the counter 18 is phase-locked with the rotation speed of the target area 10, the count at any given time shown on the counter 18 shows where the angle segment of the orbit 8 at which the significant point where a significant change in intensity, such as light intensity, occurs is presently located. The control loop will be phase-locked when the target area is in a rotation speed range within which the locking range of the control loop itself lies. In this manner, the minimum requirements of a scan theory can be met, as already described previously.

The voltage-controlled oscillator 9 is driven by the phase detector and filter switch 11 in such a manner that it oscillates at those frequencies where the counter 18 (digital divider) produces an overrun signal for each change in the momentary angle information signal from the maximum to the minimum angle that is, when the significant point on the orbit 8 of the target area 10 revolves through the zero point. This zero or starting point on the orbit 8 is determined when the cover 4 on the disc 5 passes through the beam between emitter 22 and receiver 23. The module of the counter 18 is selected so that the rotation of the target area 10 can be subdivided into as many equal parts as desired. Rotational speed data can be obtained from changes in the momentary angle information signal 12 or, even more directly, from the output impulses of the counter 18 with the phase-controlled control loop (9, 18, 11) locked.

Figure 4:
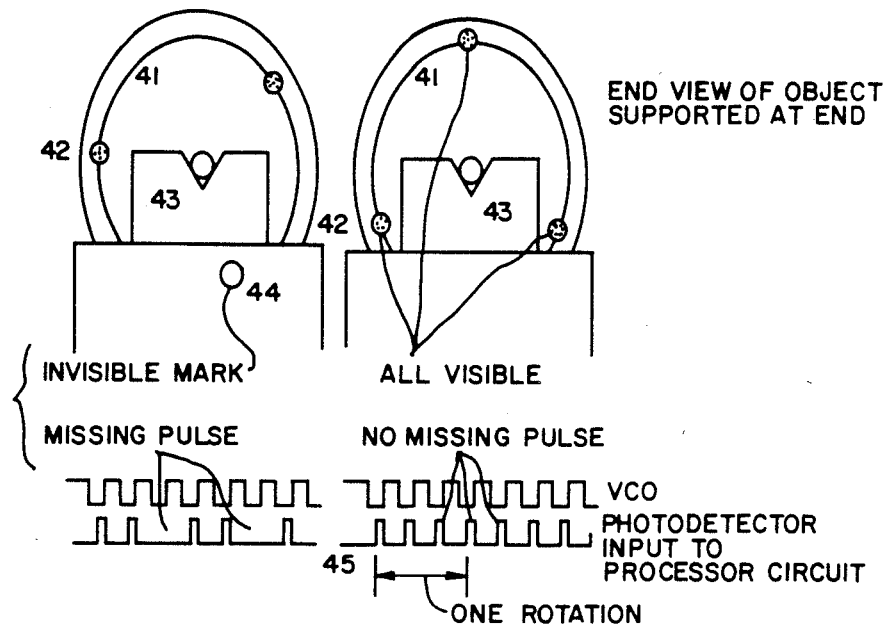
FIG. 4 is a front view of a second embodiment of the present invention where the target area of the test object is partially covered.

FIGS. 4 and 5 show a second embodiment of the present invention in which a part of the target area 10, viewed from the measuring unit, is covered by, for example, tools, mounting stands, etc. In these cases it is necessary to have more than one significant point at which the reference signal is formed because of a significant change in the beam properties. One of these significant points must always be visible from the measuring area. That is, the scanning beam 7 must always be able to reach one significant point. With the example schematically depicted in FIG. 4, it is necessary that another phase-controlled control loop be present directly on the signal processor 14 and that a divider be also connected to this, as will be explained below with reference to FIG. 5. The phase-controlled control loop consists of the phase detector 54, 55, the voltage-controlled oscillator 51 and the divider 52 acting as a digital divider. The voltagecontrolled oscillator 51 oscillates at those frequencies which correspond to the rotational speed of the disc 5 multiplied by the number of significant points on the orbit 8 of the target. The example in FIG. 4 contains three significant points: 41, 42 and 43 on the orbit 8. In the example in FIG. 4, two of the significant points 41 to 43 can always be scanned by the beam 7 of the scanning and measuring equipment.

The output signal which is fed to the signal memory 13 represents the output signal of the voltage-controlled oscillator 51 which has been divided by the number of significant points on the target area 10 by the counter 52 acting as a divider. The phase detector 54, 55 is not affected by the non-appearance of impulses, that is, it cannot be constructed to be frequency sensitive. In this manner, the missing impulses arising from the significant points being covered are produced by the divider as described and can be used by the signal memory 13.

The voltage-controlled oscillator 51 can be constructed as a voltage-controlled saw-tooth generator. The beam detector impulse provided by the signal processor 14 is fed to a monostable oscillator 56 which generates a sharp scan impulse which trips an analog switch 54 only once. The momentary voltage of a saw-tooth signal from the oscillator 51 at the time of a scan impulse is stored in a condensor 24 (storage switch 55) and passed through a lowpass filter 53 after band width control to be used to steer the saw-tooth generator frequency. When the beam detector impulse and the saw-tooth signal have the same frequency, each scan impulse will appear on the wave front at the same height and the same voltage will be stored in condensor 24. It follows that the frequency of the voltage-controlled oscillator 51 does not change. If the beam detector impulse appears later or at a lower frequency or earlier or at a higher frequency the scan impulse will also appear at different points e.g. at higher or lower voltage on the wave front of the saw-tooth signal. Thus, the frequency of the voltagecontrolled oscillator 51 is corrected so that the rotational speeds of the target area 10 and the disc 5 are matched.

The lock-in range of the control loop or the range over which a starting lock can be achieved must be limited to a range near to that of the rotational speed of the disc 5, while the actual lock range or the range over which locking can be effectively maintained, must encompass the rotational speed of the disc 5 plus or minus the rotational speed of the target area 10.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method to determine the relative reference position for angle measurement of an object within an angle scale covering the entire rotation of the object and divided into several incremental angles of equal size, by which a relative reference position is determined from a reference signal generated by the rotation of the object, comprising the steps of:

generating a reference signal by energy exposure of a target area on the object to be measured;

calculating a significant deviation from the reference signal at least one point during rotation of the object, this deviation being representative of an angle value of the angle scale;

determining the relative reference position of the object to be measured from said reference signal to said significant deviation; and dividing the round angle of the object into incremental angles, beginning with the relative reference position of the object to be measured.

2. Method in accordance with claim 1, further comprising the step of scanning the energy given off by the exposed target area along an orbit.

3. Method in accordance with claim 2, further comprising the step of exposing the target area along a circular path, which forms a rotational path.

4. Method in accordance with claim 3, further comprising the step of directing a modulated or coded signal at the target area.

5. Method in accordance with claim 4, wherein the energy that the target is exposed to is visible light.

6. Method in accordance with claim 5 further comprising the step of dividing the round angle of the object into incremental angles, beginning with the relative reference position of the object to be measured.

7. Method in accordance with claim 1, further comprising the step of scanning the target area at which the reflected light intensity of the orbit lies above a predetermined threshold value determined from the intensity values obtained from the remainder of the orbit thereby determining at least one significant point on the orbit.

8. A method as in claim 1 wherein the object is a rotor.

9. Method to determine the relative reference position for an angle measurement of an object within an angle scale covering the entire rotation of the object and divided into several incremental angles of equal size, by which a relative reference position is determined from a reference signal generated by the rotation of the object, comprising the steps of:

generating a reference signal by energy exposure of a target area connected to an object to be measured;

calculating a significant deviation from the reference signal at at least one point during rotation of the object, this deviation being representative of an angle value of the angle scale;

determining the relative reference position of the object to be measured from said reference signal and said significant deviation.

10. Device to determine the relative reference position for an angle measurement of an object comprising:

a source of energy for focusing a first beam onto a target area of the object;

a scanning unit to produce a reference signal;

means to rotate said object so that said beam follows an orbit, said beam having generally uniform reflective characteristics so as to produce a deviation from these characteristics at at least one point along the orbit;

an angle scale means for subdividing the round angle conforming to a complete rotation into incremental angles;

means to measure a second beam reflected from said object.

11. Device in accordance with claim 10 wherein said energy source is a light source.

12. Device in accordance with claim 11, further comprising:

a light detector;

a signal memory connected to said detector;

means to direct said second beam to said detector.

13. Device in accordance with claim 12, further comprising means for rotating said first beam around an axis.

14. Device in accordance with claim 13, further comprising means to rotate the target area.

15. Device in accordance with claim 14, wherein the target area lies on a body on which the angle measurement is made.

16. Device in accordance With a claim 15, further comprising phase control means connected to the signal memory.

17. Device in accordance with claim 16, wherein the angle scale means is connected to the signal memory.

18. Device in accordance with claim 17, wherein at least one measurably significant point or mark to influence the light beam is present on the surface of the target area.

19. A device in accordance with claim 18, further comprising a signal processor connected between the light detector and the signal memory which determines at least one significant point on the orbit of the target.

20. A device in accordance with claim 19, wherein a plurality of significant points are determined, and the device further comprises:

a phase-locked control circuit connected to the signal processor for generating a signal synchronous with the target rotations; and a divider which divides the output signals of the phaselocked control circuit by the number of significant points.

21. A device in accordance with claim 13 wherein the means for rotating the first beam around an axis comprises a first tilted mirror mounted along the axis and a second tilted mirror rotating around the axis, wherein the light source emits the first beam along the axis via the first tilted mirror to the second tilted mirror and, finally, onto the target area.

22. A device in accordance with claim 21 further comprising a third tilted mirror mounted along the axis between the light source and the first mirror wherein the second beam reflected from the target area returns via the second tilted mirror to the first tilted mirror and onto the third tilted mirror, and wherein the third tilted mirror directs the second beam to the light detector.

* * * * *